Patented Oct. 26, 1943

2,333,032

UNITED STATES PATENT OFFICE 2,333,032

RUBBER MIXTURE

David Pelton Moore, Avon Park, Fla., assignor to X-L Chemicals, Incorporated, a corporation of New York No Drawing. Application April 20, 1940, Serial No. 330,695

1 Claim. (Cl. 260—815)

The present invention relates to improvements in rubber mixtures, one object of the invention being the production of a composition of an aqueous dispersion of rubber, ammoniated, or not, which is made alkaline and capable of becoming vulcanized at a temperature, or temperatures below 100° C., when exposed to the air, but which requires a retarder of vulcanization embodied therein, thus contradistinguishing it from the known product of "Vultex," as set forth in U. S. Letters Patent No. 1,682,857, granted to Philip Schidrowitz, wherein an "accelerator" is absolutely essential.

It has been discovered that rubber latex may be made the proper alkalinity by such chemicals as plaster of Paris, Portland cement, and/or calcium hydroxide, as well as a solution of sodium bisulphite, and that solutions made from any of these will have the effect of coagulating almost immediately the latex, and that therefore to make these elements in their use with latex commercial, a retarder of vulcanization is essential and must be employed.

In lieu of the above noted vulcanizing agents it has been found that sodium bisulphide and/or epsom salts may be made in a solution to be mixed with the retarder and latex.

The following examples will give some idea as to what can be employed, and still be within the present invention.

Example 1

|  | Per cent |
|---|---|
| Rubber latex, 60-63% | 40 to 80 |
| Vulcanizing agent | 20 to 60 |
| Retarder | 2 to 10 |

Example 2

| | |
|---|---|
| Rubber latex, 60-63% | 40 to 80 |
| Plaster of Paris, Portland cement, and/or unslaked lime | 20 to 60 |
| Retarder | 2 to 10 |

Example 3

| | |
|---|---|
| Rubber latex, 60-63% | 40 to 80 |
| Sodium bisulphite solution 5 to 40% | 20 to 60 |
| Retarder | 2 to 10 |

Example 4

| | |
|---|---|
| Rubber latex, 60-63% | 40 to 80 |
| Calcium hydroxide, 1,000 hydrometer test | 20 to 60 |
| Retarder | 2 to 10 |

The retarders that have been found to be workable in the above noted examples are bicarbonate of soda, carbonate of soda, borax, sodium perborate, hyposulphate of soda or "hypo" used as fixing agent in photography, and the combinations thereof.

Therefore where the word "retarder" is used in the examples, it is intended to imply any of the above, or mixtures thereof, as the two carbonates can be mixed 50-50, or varying proportions with excellent results, while borax and either carbonate may be mixed together.

The bisulphite of soda should first be dissolved in water, and then the sodium perborate added, and after this mixture has slightly cooled, mixed with the latex.

To any of these examples, plaster of Paris may be added as a filler, and to retard its setting up action, there is provided a solution of any one of the retarders, to which is stirred in the latex composition to be used, and finally the plaster of Paris. The proportions in this instance are latex composition 3 to 4 parts, solution 1 part, and plaster 1 to 2 parts. This makes an excellent rug backing, and can be colored with alkaline dyes.

What is claimed is:

A composition composed of calcium hydroxide 20 to 60%; a compound from the group consisting of the borates and carbonates soluble in the hydroxide 2 to 10%, and an aqueous dispersion of rubber 40 to 80%.

DAVID PELTON MOORE.